United States Patent [19]

Ishibashi et al.

[11] Patent Number: 4,538,253

[45] Date of Patent: Aug. 27, 1985

[54] DISC PLAYING SYSTEM WITH CONTINUOUS PLAYING FUNCTION

[75] Inventors: Masaya Ishibashi; Atuki Tada, both of Tokorozawa, Japan

[73] Assignee: Pioneer Electronic Corporation, Tokyo, Japan

[21] Appl. No.: 639,469

[22] Filed: Aug. 10, 1984

[30] Foreign Application Priority Data

Aug. 12, 1983 [JP] Japan .............................. 58-147828

[51] Int. Cl.³ ...................... G11B 15/00; G11B 17/08
[52] U.S. Cl. ........................................ 369/34; 369/36
[58] Field of Search ................. 369/34, 36, 37, 38, 369/39, 33

[56] References Cited

U.S. PATENT DOCUMENTS

| | | | |
|---|---|---|---|
| 1,868,846 | 7/1932 | Oyston . | |
| 3,131,936 | 5/1964 | Hagen | 274/10 |
| 3,246,899 | 4/1966 | Bodenroder | 274/2 |
| 3,378,264 | 4/1968 | Foufounis | 274/10 |
| 3,420,532 | 1/1969 | Osborne et al. | 369/37 |
| 3,662,344 | 5/1972 | Menke | 369/39 |
| 4,092,671 | 5/1978 | Camerik | 358/128 |
| 4,218,065 | 8/1980 | van der Hoek et al. | 274/9 R |
| 4,273,342 | 6/1981 | Gilson et al. | 369/39 |
| 4,502,133 | 2/1985 | Siryj et al. | 369/38 |

*Primary Examiner*—Steven L. Stephan
*Attorney, Agent, or Firm*—Fleit, Jacobson, Cohn & Price

[57] ABSTRACT

A disc playing system for playing a plurality of discs in succession, having a disc storing part in which a plurality of disc are juxtaposed in a predetermined order, comprises a disc carrying means movable along the direction of the arrangement of the discs in the disc storing part, a transportation means for transporting a disc between the storing position and the disc carrying means, a memorizing means for memorizing an order of arrangement of each disc in the disc storing part, a detection means for detecting a frequency of playing of each disc, and a control means for operating the disc carrying means and transportation means for altering the order of arrangement of discs in the disc storing part in accordance with the detected result of the playing frequency of each disc, whereby the time required for changing the disc during a continuous playing is greatly reduced.

1 Claim, 34 Drawing Figures

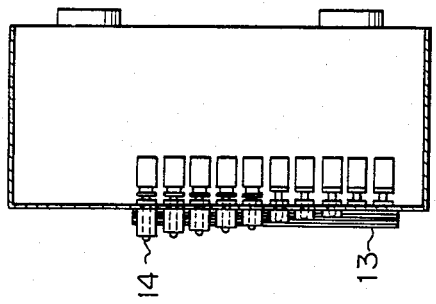
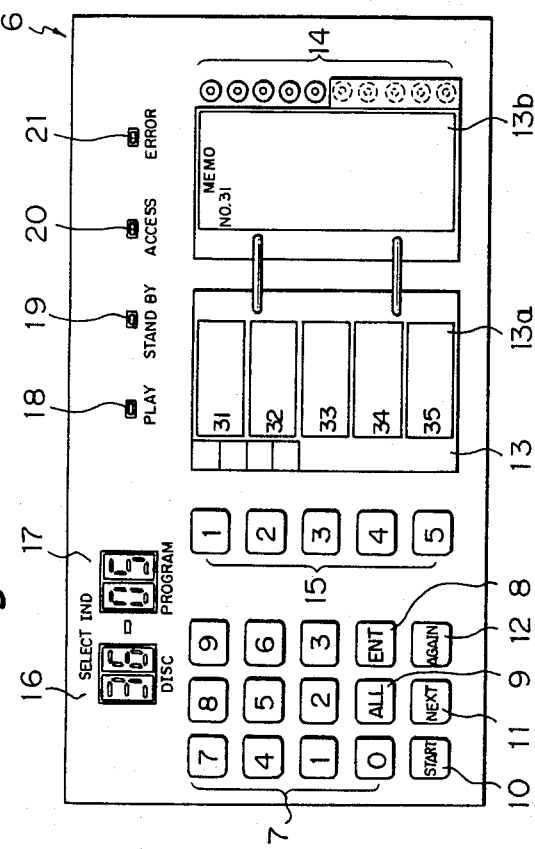

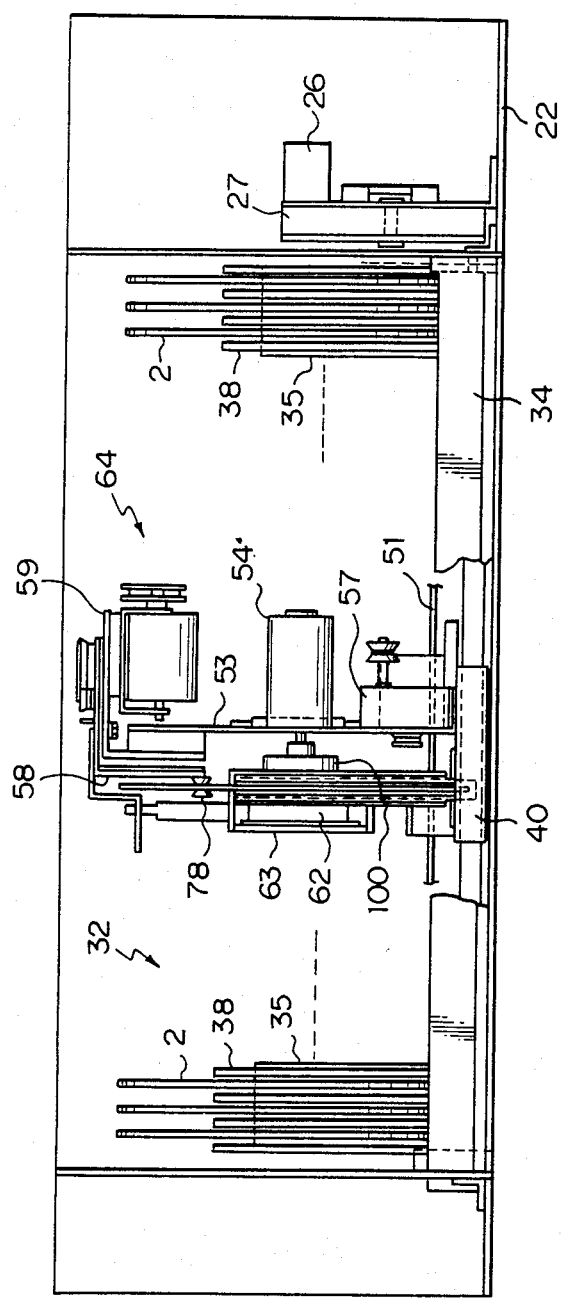

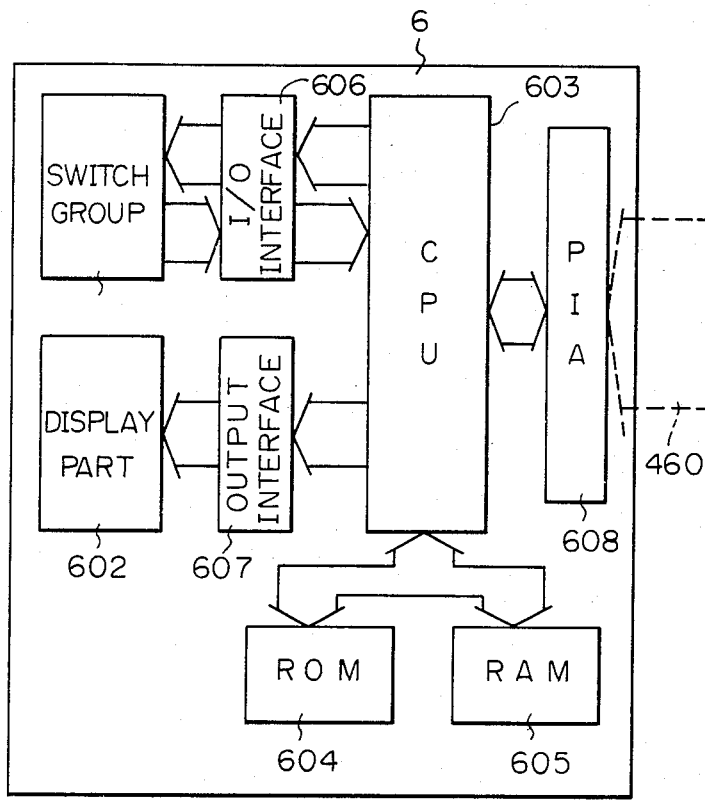

Fig. 11
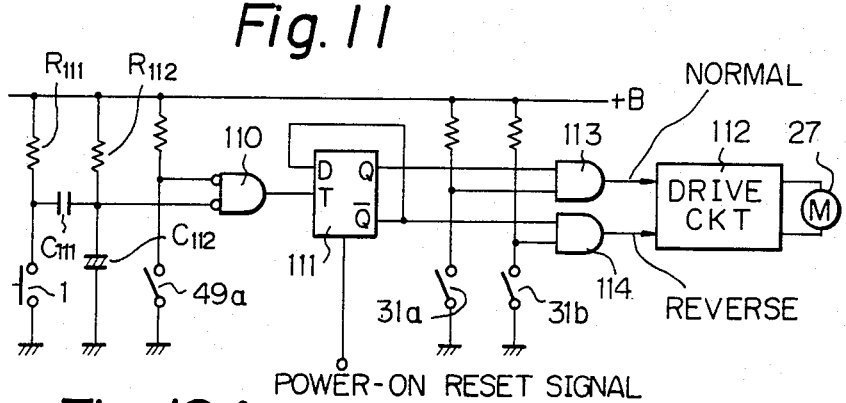
Fig. 12A
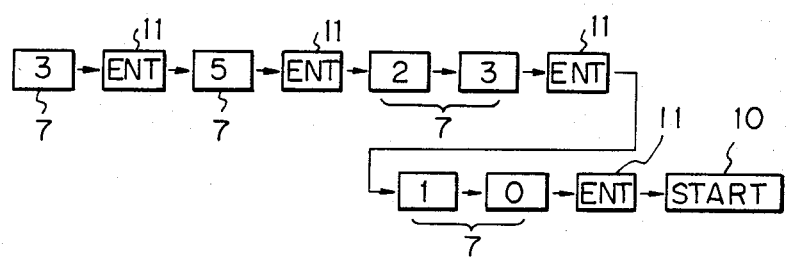
Fig. 12B    Fig. 12C
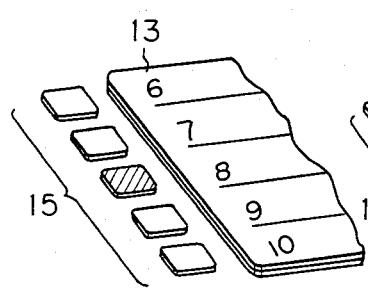 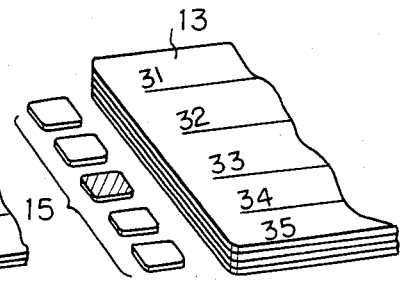
Fig. 12D
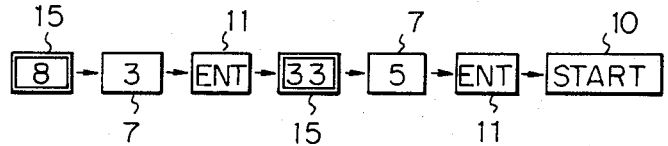

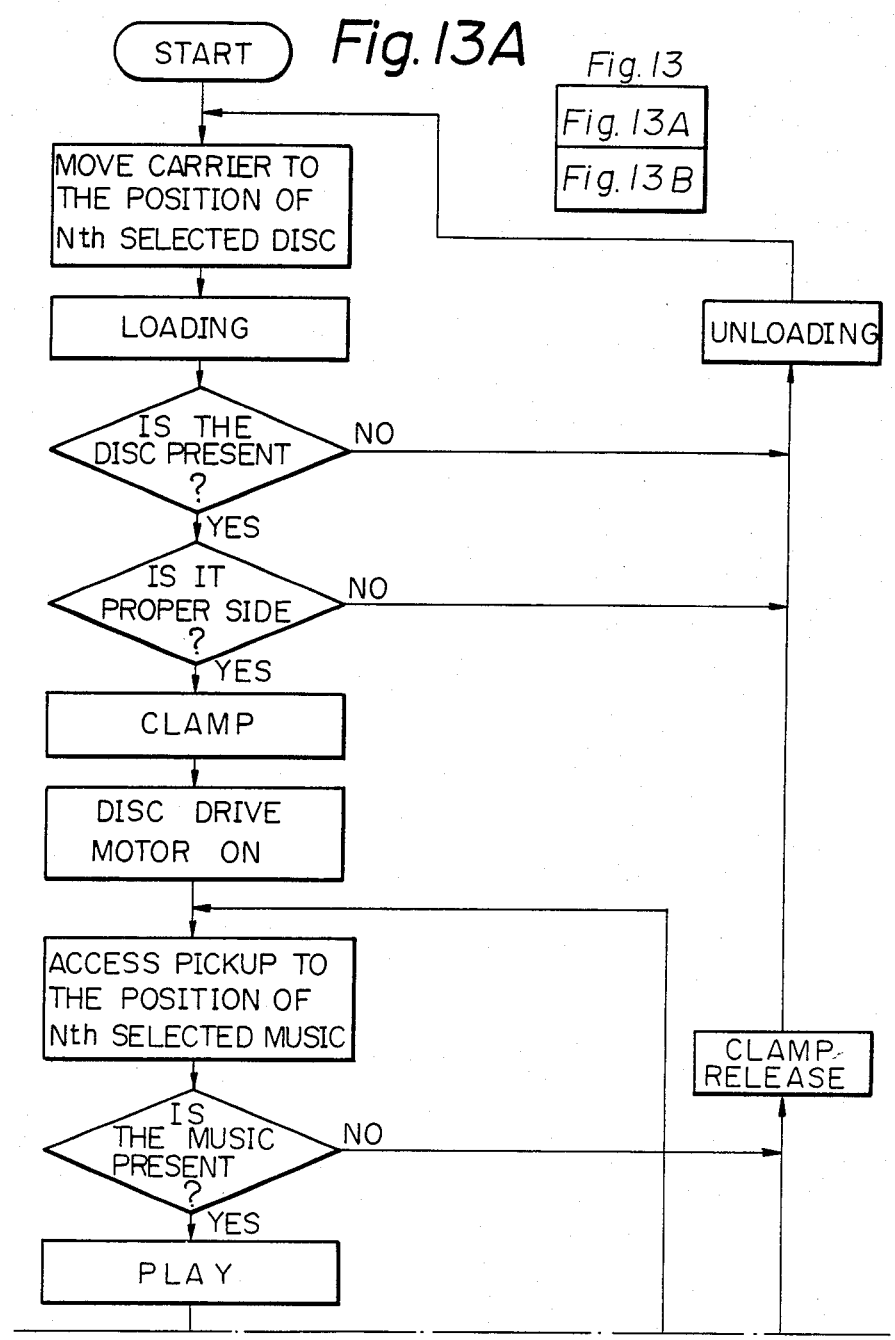

4,538,253

DISC PLAYING SYSTEM WITH CONTINUOUS PLAYING FUNCTION

BACKGROUND OF THE INVENTION

1. Field of the Invention

The present invention relates to a disc playing system, and more particularly to a disc playing system which stores a plurality of discs and capable of continuous playing of discs in order and which discs are arbitrarily selected from the stored discs.

2. Description of Background Information

As an example of the disc playing system of this type, a disc displaying system is described in Japanese Patent Application No. 56-67396 corresponding to U.S. patent application Ser. No. 373,123, filed May 2, 1982. In this disc playing system, a plurality of discs are stored in a disc storing part and juxtaposed at a predetermined space. A disc playing means is provided to be slidable along the direction of the arrangement of the discs, and a detection means is provided for detecting the position of the disc playing means relative to each storing slot of the disc storing part. The detection means is for example made up of a parforated plate and a light sensor having a light emitting element and a light receiving element. The disc playing means is translated along the direction of the disc arrangement and stop position is controlled in accordance with the output signal of the light sensor so that the disc playing means stops at the position of a selected disc. The playing of the selected disc is parformed after the disc is moved from the disc storing part to the playing position by means of a disc transportation means.

With this disc playing system, when a plurality of discs are to be played in succession, the already played disc is returned to the slot of the disc storing part by means of the disc transportation means. Then, disc storing slot which stores the disc to be played next is searched and the playing means is translated to the position of the searched slot. The selected disc to be played next is then moved from the slot to the playing position by means of the disc transportation means.

Thus, in the case of this disc playing system, the correspondence between each of the discs and each of the disc storing slots is not to be altered once it is determined. Since the position of the disc, i.e. the destination of the translation of the disc playing means, is determined according to the disc number assigned to each disc, the period between musics required for changing the disc may become excessibly long if the positions of two discs in the disc storing part are greatly away from each other as compared with the space between adjacent two discs. Further, the problem becomes serious if the distance between the storing positions of two discs which are played frequently is very large.

SUMMARY OF THE INVENTION

A object of the invention is therefore to provide a disc playing system in which the time period required for changing the disc is minimized and the discs are played continuously with smoothness.

According to the present invention, the disc playing system features that the correspondence between each of the numbers assigned to the discs and each of the numbers assigned to the disc storing positions of the disc storing part is memorized in a memory means. Further, the frequency of the playing of each disc is detected and the order of arrangement of discs in the disc storing part and the above mentioned memorized correspondence are altered in accoedance with the detected result of the playing frequency of each disc.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 2A through 2C are respectively, a plan view, a partially sectional front view, and a cross sectional side view of the control unit to be used with the main unit, both shown in FIG. 1;

FIGS. 3A through 3C are respectively, a plan view, a front view, a side view of the main unit;

FIG. 11 is a block diagram of a door control part;

FIGS. 12A through 12D are diagrams showing the steps of music selection operation;

DETAILED DESCRIPTION OF THE PREFERRED EMBODIMENT

The invention will be explained with reference to the accompanying drawings hereinafter.

Figure 1:
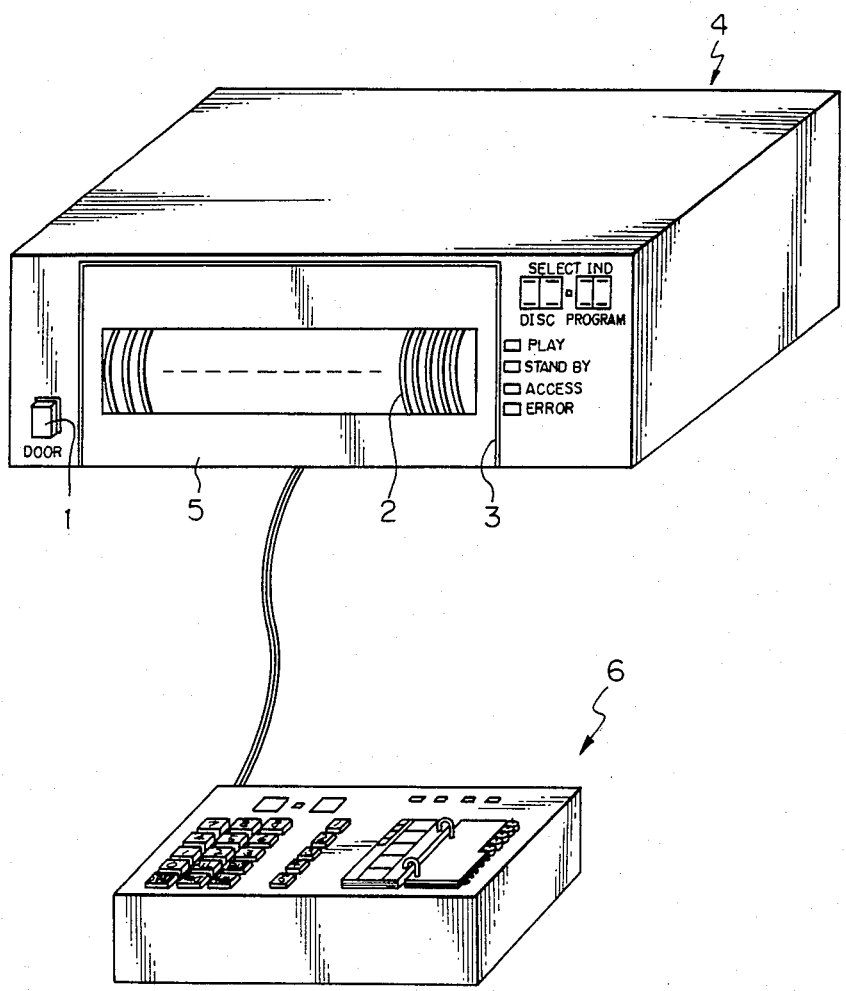
FIG. 1 is a perspective view showing the general construction of the disc playing system of the present invention.

FIG. 1 is a perspective view of the disc player system of the invention in which the general structure of player system is illustrated. In FIG. 1, the player system includes a housing of a main unit 4 in which a plurality of discs 2 are housed and the discs are played automatically. The housing has a construction suited for stacking with other appliances such as an amplifier and a tuner of similar size. A disc entrance port 3 is formed, for example, in the front face of the housing. A disc holder (to be explained later) is provided near to the disc entrance port 3 so that the discs are loaded and removed with ease. A door 5 for closing the disc entrance port 3 is connected to the housing. The opening and closing of the door is performed by means of a door switch 6 mounted in the front face of the housing. Also, there is provided a control unit 6 which transmits various commands to the main unit 1 and connected to the main unit 1 via a wired or wireless connection means.

FIGS. 2A through 2C show the construction of the control unit 6, in which FIG. 2A is a plan view, FIG. 2B is a partially sectional front view, and FIG. 2C is a side view respectively. The control unit 6 has a plurality of operation keys thereon. The keys comprise number keys 7 to which the numbers 0 through 9 are alloted for the designation of the number of disc and the number of music to be selected, an ENT key 8 for registering the selected number in a memory means, an ALL key 9 for the selection between a play mode for playing the discs in order from a first disc and a play mode for playing all of the designated discs, a START key 10 for starting the play after completion of the designation in the memory means, a NEXT key for commanding the shift to the next disc/music registered in the next position in the memory means while a disc/music registered in the memory means is being played, and an AGAIN key 12 for commanding the replay of the music in accordance with the contents registered in the memory means. Further the controle unit 6 has a plurality of index plates 13 on which the title or the program can be entered and altered in connection with the replacement of the discs, and operatable as a memory means which is easy to look up, a plurality of index switches 14 for picking out one of index plates 13 being searched for, with the index switch 14 interlocked with the index plates 13, and prepared as many as the number of index plates 13, and a plurality of index keys 15 from number 1 through number 5 for designating the disc number separately from the number keys 7. As mentioned above, the title or the program name on the index plates 13 can be altered easily in relation to the replacement of the discs.

In addition, both main unit 4 and control unit 6 are respectively provided with a display device which comprises a DISC indicator 16 for displaying the number of the disc designated or being played, a PROGRAM indicator 17 for displaying the number of the program designated or being played, a PLAY indicator 18 for displaying the playing state, a STAND BY indicator 19 which lights up from a time when a carrier assembly (described later) is stopped at a predetermined position to a time when the carrier assembly is in playing state, an ACCESS indicator 20 which lights up during a time when the carrier assembly and a pickup (described later) are moving to a predetermined position, and an ERROR indicator 21 which lights up when the disc is not present in a position of designated disc number, or the disc is placed reversely and such a state is detected in the playing state.

Although the control unit 6 with a memory means and verious operation keys is prepared separately from the main unit 4 in the above explained example, these elements may be provided to both of the main unit 4 and the control unit 6 or solely to the main unit 4, in the front face for example.

Figure 3A:
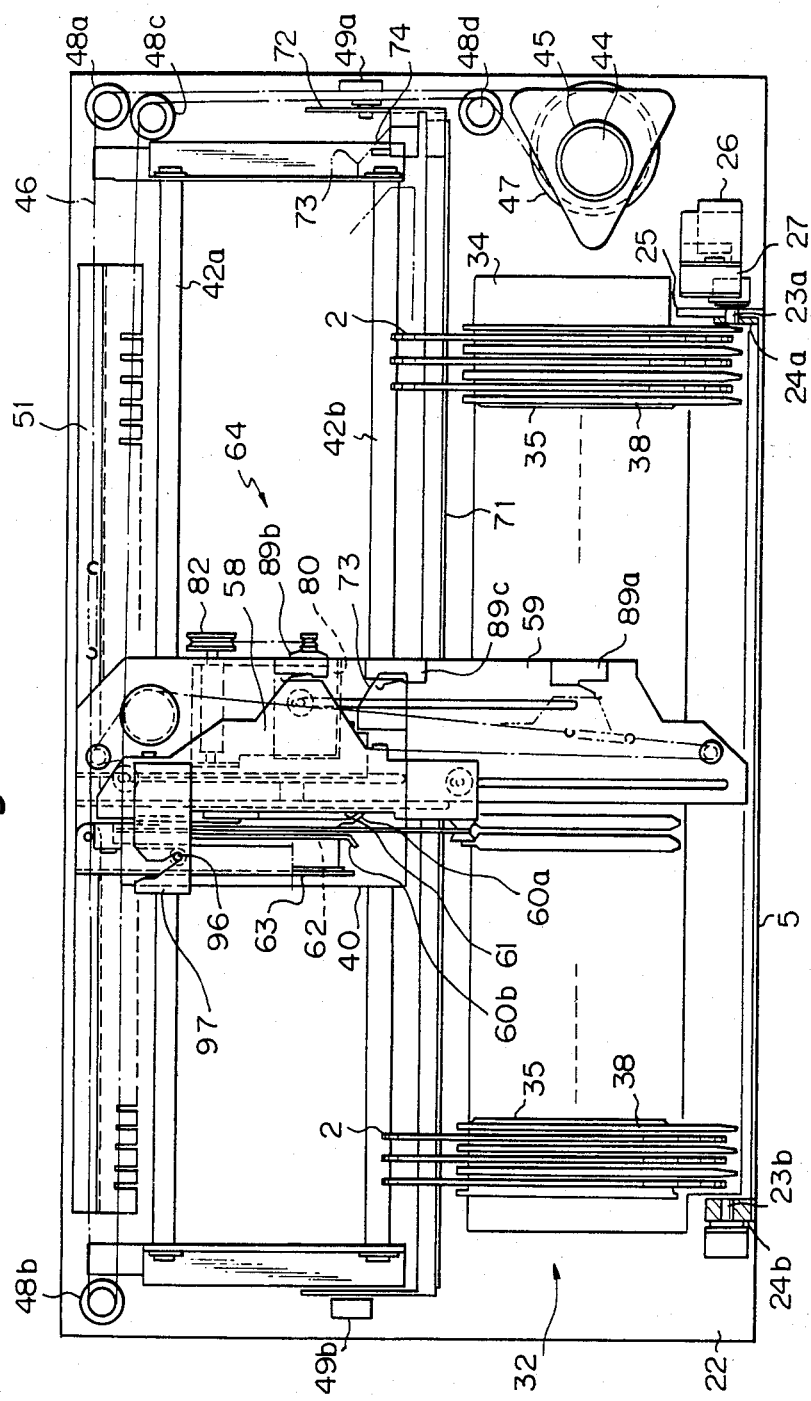
Figure 3C:
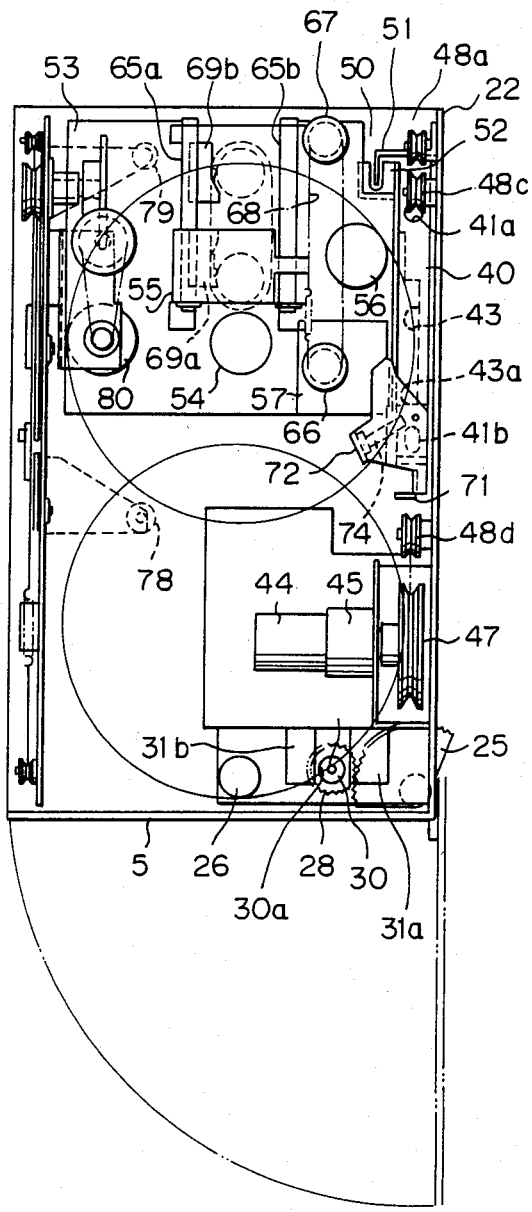

FIGS. 3A through 3C show the construction of the disc player system, where FIG. 3A is a plan view, FIG. 3B is a front view, and FIG. 3C is a side view. Before explaining the internal construction, the peripheral portion of the door 5 previously mentioned is covered by paint for example. Further, the door is provided with a pair of support pins 23a, 23b fixed to the under base 22 and a pair of bearings 24a, 24b respectively engageable with the support pins 23a, 23b. A sectoral gear 25 is connected to one, for example the bearing 24a of the bearings 24a and 24b. A drive motor 26 and a reduction gear 27 for opening and closing the door 5 are provided and secured on the under base 22. A gear 28 of the final stage of the reduction gear 27 is meshed with the sectoral gear 25. A cam 30 having a recess 30a on the outer surface is fixed on a shaft 28 of the gear 28 of the final stage. A pair of limit switches 31a and 31b each having a cam follower are provided and abut against the outer surface of the cam 30 so as to detect an open limit and a close limit of the door 5 when the cam follower is received in the recess 30a.

Figure 4:
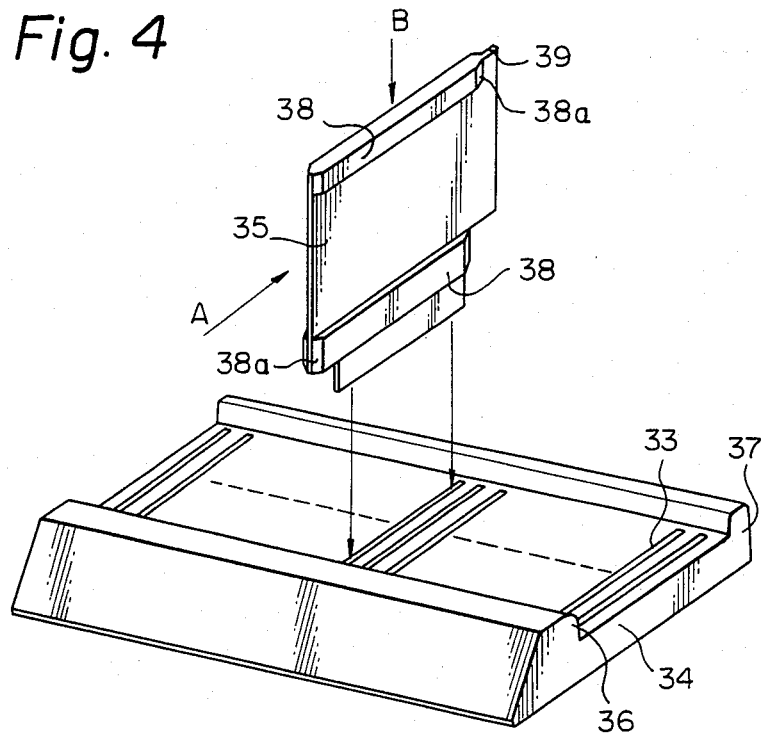
FIG. 4 is a general perspective view of the disc storing part.

As shown in the perspective view of FIG. 4, a disc storing part 32 for storing a plurality of discs comprises a support base 34 having a plurality of grooves 33 and fixed to the under base 22 and a plurality of partition plates 35. The discs 2 are placed between the partition plates 35 and supported in the grooves, thus uprightly juxtaposed with each other. The support base 34 is made by a member of single piece and a pair of supports 36, 37 for bearing the lower end of a disc 2 placed in the groove 33 at two points, and for the positioning of the disc 2 in the longitudinal direction of the slot 33 are provided in the front and in the rear of the support base 34, for example, as a solid block. The height of the support 36 of the front side (on the side of the disc entrance port 3) is made higher than the support of the rear side so as to prevent the discs 2 from falling out from the front side due to an external disturbance, and at the same time to restrain the free movement of the stored discs. In addition, the supports 36, 37 may be prepared as separate parts with respect to the support base 34.

Figure 5A:
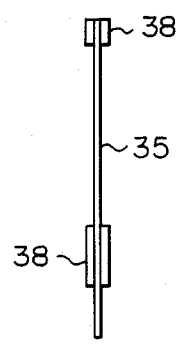
FIGS. 5A and 5B are respectively a front view and a plan view of the partition means viewed respectively from the direction of the arrow A and the arrow B of FIG. 4.
Figure 5B:
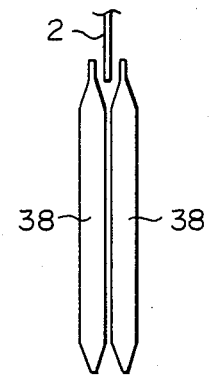

In the disc storing part 32, each disc 2 is strored in such a manner as to be held between adjacent two of the partition plates 35. As shown in the front view FIG. 5A, the partition plate 35 has a generally I-shaped cross section and provided with guide walls 38 at the top portion and the lower portion thereof. This is to reduce the friction btween the disc 2 and the partition plate 35 during the movement of the disc and to prevent the damage to the disc 2. Further, the surface of the guide wall which contacts with the disc 2 is coated by a low friction material such as the Teflon. In order to facilitate the insertion of a disc 2 from the door side and the returning of a disc 2 from the playing position, the front and back ends of the guide walls are formed as a tapered or curved part 38a. Moreover, the tapered part 38a of the playing position side is prolonged to a parallel part 39 overlaps the peripheral portion of the disc 2 when placed in the playing position. With this configuration, the disc 2 is surely guided into the disc storing slot between the partition plates 35 after the playing of the disc is completed.

In FIG. 3, a carrier 40 for supporting a disc playing part is slidably mounted on a pair of guide bars 42a, 42b at round holes 41a and oval holes 41b provided in side portions thereof. The carrier 40 is provided with a guide support 43 which has thereon a concave part for the positioning of the disc drawn from the disc storing part 32 by means of a slider to be described later, at the time of playing. The guide support 43 is adapted to support the lower periphery of the disc at two points in a manner that the center of the disc mounted thereon is slightly lower than the center of a clamper which will be described in detail later. The guide support 43 is provided with a slope 43a on the side of the disc storing part 32 so that the disc is moved smoothly. Further, a slope can also be provided on another side of the guide support so that the disc can be returned to the playing position surely in the event that the disc is dislocated backwards from the playing position.

The carrier 40 is moved in the left and right direction by means of a drive motor 44 via a reduction gear 45 and a wire 46. The wire 46 is spreaded on a pulley connected to the reduction gear 45, four pulleys mounted on the under base 22, and a magnet 48d, and fixed to the carrier 40. To detect a left limit and a right limit of the movement of the carrier 40, there are provided a pair of carrier limit switch 49a, 49b. Assuming that a siding position of the carrier 40, i.e., a home position is in the right hand end of FIG. 3, then the carrier limit switch 49a can be used for detecting that the carrier 40 is in the home position. Further, a carrier position detection sensor 50 is provided to detect the shift amount of the carrier 40. The carrier position detection sensor 50 has an elongated slit plate 51 fixed to the under base in which a slit is formed along the direction of the movement of the carrier 40 correspondingly to the disc storage position of the disc storing part 32, and a light sensor 52 having a light emitting element and a light receiving element and mounted on the carrier 40 in such a manner as to put the slit plate 51 in a gap formed therein.

A mechanism base 53 is fixed on the carrier 40 and which carries thereon various parts such as a disc drive motor 54 for rotating the disc, a pickup 55 for the readout of disc information movably supported on the mechanism base 53, a pickup drive motor 56 and a reduction gear 57 for moving the pickup, a slider 58 for drawing out a disc stroed in the disc storing part 32, a guide base 59 for guiding and supporting the slider 58. Further, as a means for playing the disc, a carrier assembly 64 is made up of a pair of guide plates 60a, 60b for guiding the disc drawn out from the disc storing part 32 to the playing position, a disc side/presence sensor 61 fixed on one of the guide plates 60a, 60b for detecting the presence of the disc and the side of the disc, and a clamp arm on which a clamper 62 for holding the disc is mounted.

The pickup 55 is supported by a pair of guide bars 65a and 65b fixed on the mechanism base 53 so as to move in the radial direction of the disc. The drive force of the pickup drive motor 56 is transmitted to the pickup 55 via a cable 68 fixed thereto and spread on a pulley 66 connected to the reduction gear 57 and a pulley 67 fixed on the mechanism base 53. To detect the inner limit position and the outer limit position of the pickup 55 with respect to the disc, pickup limit switches 69a, 69b are provided.

The pair of guide plates 60a, 60b are supported to keep a predetermined space therebetween by means of a stopper pin 70 (shown in FIG. 15) prepared behind the guide plates 60a, 60b for preventing the discs from slipping off backwards. An end of the guide plates 60a, 60b facing the disc storing part 62 are bent outwards so that the deviation of the position of the carrier assembly 64 relative to the disc storing part 32 from a proper position can be neglected and the disc is surely guided to the playing position, and also that the leaning of the disc in the playing position is prevented. Although a relatively thin plate material is used as the guide plates 60a, 60b and an end of each plate is bent outwards with respect to each other in this embodiment, thick members may be used instead of the thin plates and in such a case a slope may be provided to the end of the thick members so that the space between the members gradually increases toward the tip of the members.

Figure 6A:
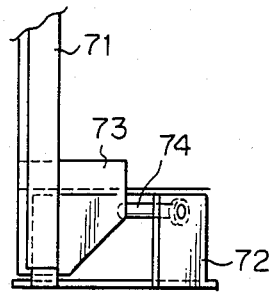
FIGS. 6A and 7A are plan views of a disc stopper respectively in the position for preventing the movement of the discs and in the position for allowing the movement of the discs.
Figure 7A:
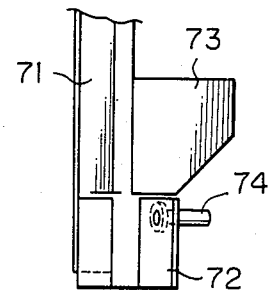

In FIG. 3, a disc stopper 71 is provided behind the disc storing part 32 so as to prevent the discs from getting off from the disc storing part 32, as being supported and positioned on a pair of stopper arms 72 rotatably supported by the under base 22. The stopper arm 72 is provided with a pin 74 which is engageable with a cam plate 73 projecting from the carrier 40. When the carrier assembly 64 is in the right limit position of FIG. 3A i.e., the home position, the pin 74 comes to contact with the cam plate 73 of the carrier 40 as shown in the front view of FIG. 6A and the side view of FIG. 6B, to locate the disc stopper 71 in a stop position for preventing the movement of the discs 2. Conversely, when the carrier assembly 64 is dislocated from the home position, the pin 74 is disengaged with the cam plate 73 as seen in the front view of FIG. 7A and the side view of FIG. 7B, to cause the rotation of the disc stopper 71 in counter clockwise direction. Thus the disc stopper 71 is sided from the stop said stop position mentioned above.

The disc stopper 71 is arranged to have the aforementioned stop position within limits in which the disc can return to the position on the supports 36, 37 when the disc is dislocated backwards. Further the disc stopper 71 can be arranged to be in contact with the discs when the discs are on the supports 36, 37. When the discs are installed in the disc storing part 32, the disc stopper 71 operates as a stop against which the discs abut, to prevent the dislocation of the discs. Also, the stopper 71 acts as a restraining member for preventing the movement of the discs 2 from the disc storing part 32 due to the external disturbance or vibration when the player system is kept unused. In addition, the restraining member can be prepared separately from the disc stopper 71 and various arrangements can be utilized for such a restraining member.

Figure 8A:
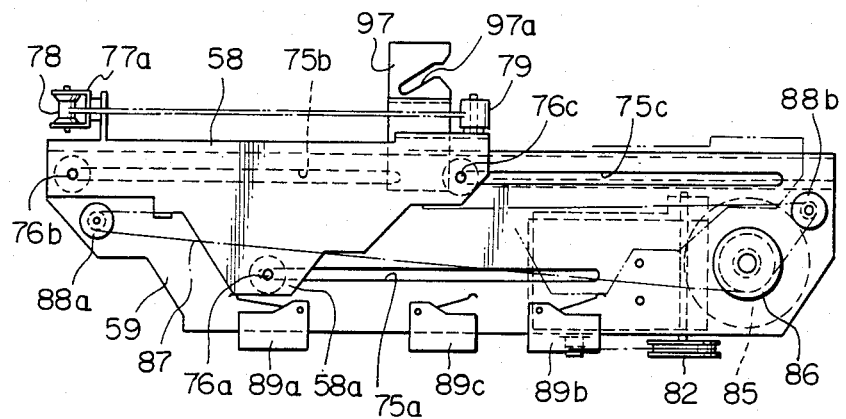
FIGS. 8A and 8B are respectively a plan view and a front view of a slider portion.
Figure 8B:
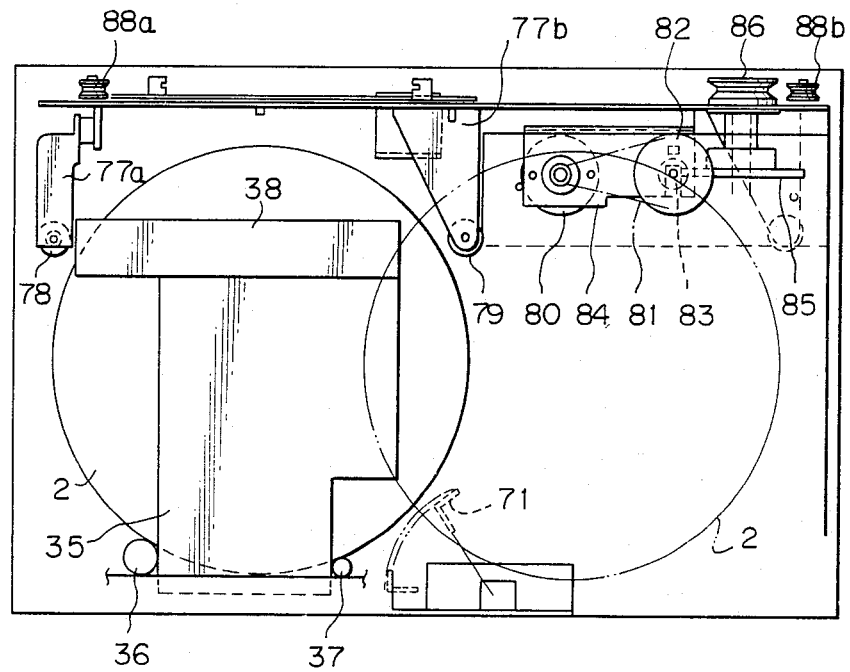

FIGS. 8A and 8B show the construction of the slider part, where FIG. 8A is a plan view and FIG. 8B is a front view. As shown, in the upper face of the guide base 59, there are provided, for example, three guide glooves 75a, 75b, and 75c, in which three guide pins 75a, 75b, 75c connected to the slider 58 is allowed to linearly slide with respect to the guide base 59.

On the slider 58, a pair of arms 77a and 77b are provided which respectively carry a drawer sheave or roller 78 and a reset sheave or roller 79. The drawer roller 78 and the reset roller 79 are spaced at a predetermined distance in the direction of the movement of the slider and adapted to contact with the pheripheral edge of disc in a manner that the pheripheral edge of the disc is put in a groove portion of the roller. The drawer roller 78 and the reset roller 79 operate as a transportation member for transporting the disc form the disc storing part 32 to the playing position and vice versa by rotating the disc.

In order to drive the slider 58, a drive motor 80 and a worm gear 83 connected thereto through a belt 81 and a pulley 82 are mounted on the guide base via a chassis 84. The worm gear 83 is meshed with a main gear to which a pulley 86 is coaxially connected. A wire 87 is wound around the pulley 86 and connected to the slider 58 via a couple of pulleys 88a, 88b provided at both ends of the guide base 59, so as to move the slider 58. Further, a pair of slider limit switches 89a, 89b for detecting the limits of the slide movement of the slider 58 by contacting with a cam projection 58a of the slider 58, and a disc detection position switch 89c for detecting the position for the detection of the presence and the side of the disc.

Figure 9A:
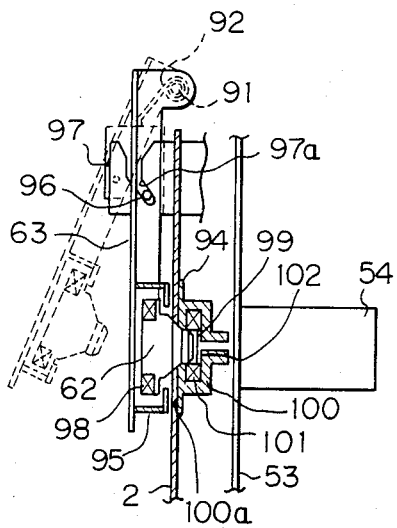
FIGS. 9A through 9C are respectively a partially cross-sectional plan view, a partially cross-sectional front view, a side view of a clamper.
Figure 9C:
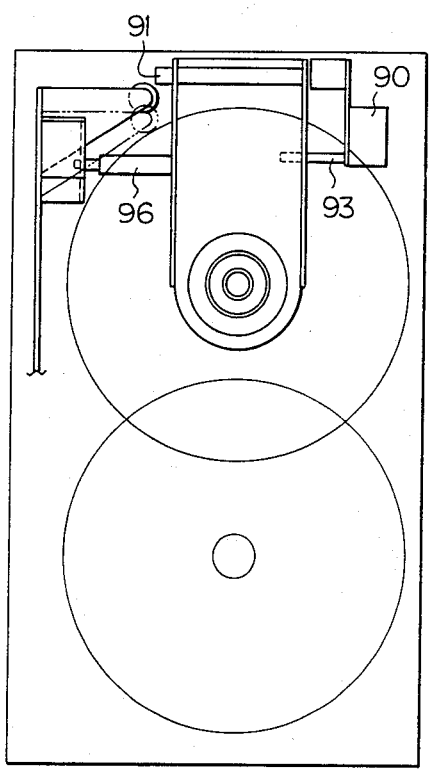
Figure 9B:
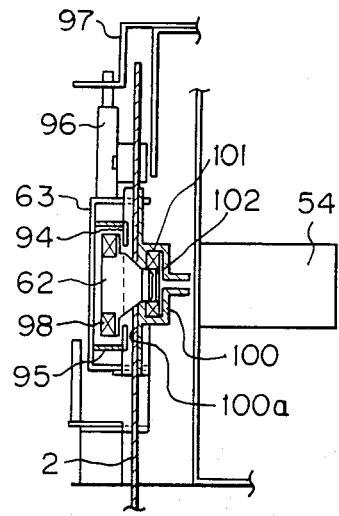

FIGS. 9A through 9C show the construction of the clamper where FIG. 9A is a partially cross-sectional plan view, FIG. 9B is a partially cross-sectional front view, and FIG. 9C is a side view. As shown, a bearing frame 90 is provided to the carrier 40 (shown in FIG. 3) and a clamp arm 63 is rotatably mounted on a shaft 91 connected to the bearing frame 90. A spring 92 is provided for urging the clamp arm 63 in clockwise direction in the figures. The range of the rotation of the clamp arm 63 is restricted by means of a pin 93 projecting from the bearing frame 63. The clamp arm 63 is provided with a guide part 95 with a magnetic part 94 at an end thereof and a guide pin 96 for governing the rotation of the clamp arm 93 in the clockwise i.e., the closing direction. When the carriage member is located in the playing position, the guide pin 96 is received in the guide slot 97a of an engaging member 97 provided to the slider 58 (shown in FIG. 8A) and moves through the guide slot 97a to cause the rotation of the clamp arm 63 against the resilient force of a spring 92. The clamper 62 having substantially a truncated cone form is provided with a ring magnet 98 at the base part thereof and a magnetic member 99 at the head part thereof, and loosely received in the clamp arm at a guide part 95 thereof. In addition, the clamper 62 and the clamp arm 63 are made of a non-magnetic material.

The drive motor 54 for rotating the disc 2 is mounted on a part of the mechanical base 53 facing the clamper 62. A turntable 100 operatable as a disc drive means is mounted on a spindle of the motor 54 and in which a ring magnet 101 and an yoke 102 are housed.

With the thus constructed clamper portion, when a disc is loaded in the playing position, the clamp arm is in turn rotated in the closing direction, as the result of an engagement of the guide pin in the guide slot 97a of the engaging member 97 provided to the slider 58. As the rotation of the clamp arm 63, the head portion of the clamper 62 passes through a center hole of the disc 2 and inserted into the turntable 100. In this instance, the magnetic material 99 of the head portion of the clamper 62 forms a magnetic circuit along with the magnet 101 and the yoke 102 in the turntable 100 so that the magnetic material is attracted to the yoke 102. As the advancement of the clamper 63, the disc 2 carried on the support guide 43 is held up by the tapering part of the clamper 62 and clamped on the face 100a of the turntable 100. The clamp arm 63 is further rotated to disengage the guide part 95 from the clamper 62 which has been coupled with the guide part 95 by the attraction force between the magnetic member 94 and the magnet 98. As the result, the disc clamping force between the magnetic member 99 and the yoke 102 is reinforced by the attraction force between the magnet 94 mounted on the base part of the clamper 62 and the magnetic member 94e clamper 62. In this state, the clamper 62, disc 2, and the turntable 100 are mechanically isolated from (do not contact with) other parts and a stable rotation of the disc 2 is secured.

Figure 10B:
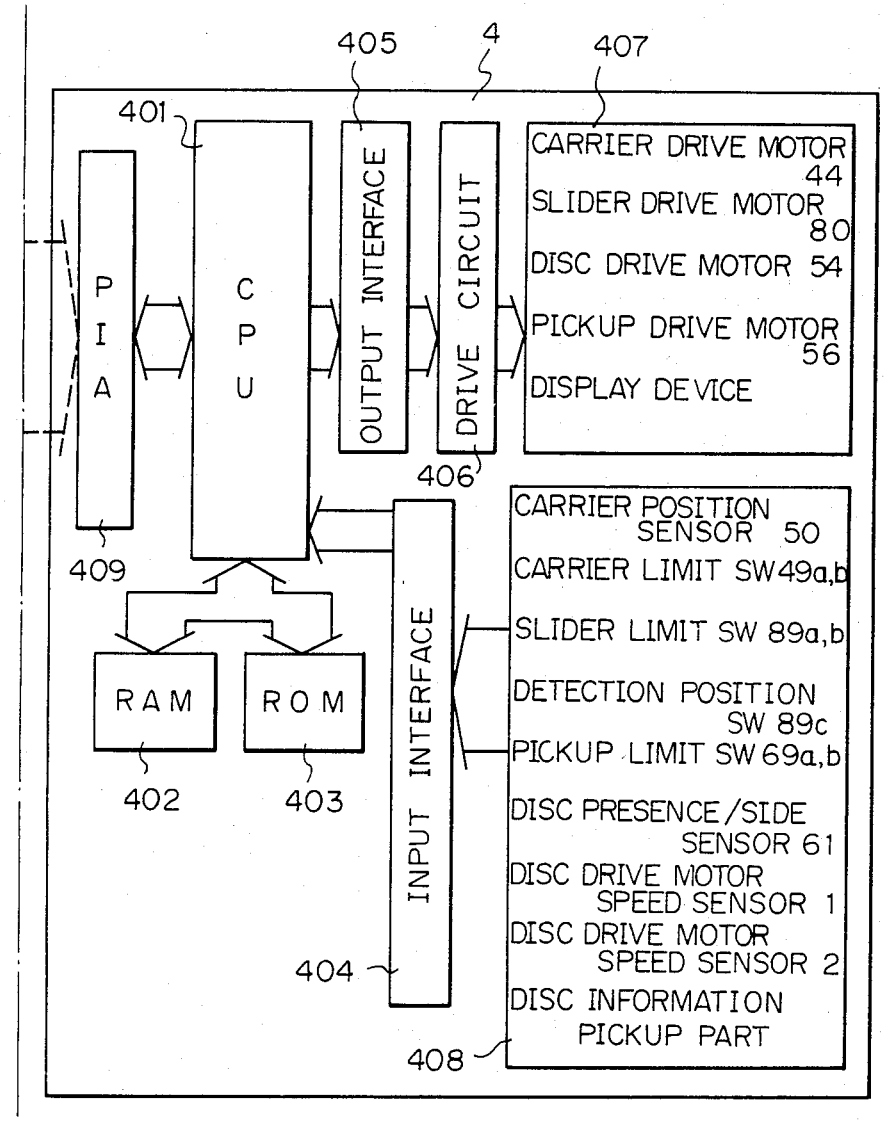
FIG. 10 is a block diagram showing the construction of a control system of the disc playing system.

Turning to the block diagram of FIG. 10, the control unit of the disc playing system according to te present invention will be explained hereinafter. The control unit 6 is provided with a group of switches 601 of music selection for designating the number of disc or the number of the piece of music as explained with referance to FIG. 2, and a display part 602 for displaying the number of the piece of music, and the mode of operation of the system. The control unit which comprises a CPU 603, a ROM 604 in which a program for the operation of the system is stored and a RAM for temporarily storing calculated results is connected to the above mentioned group of switches 601 and to the display part 602 via an input/output interface 606 and an output interface 607. The group of switches 601 is made up of a plurality of switches which are arranged as the keyboard matrix and the actuation of each switch is detected by a key scanning operation through the input/output interface 606. Thus, the key input is effected by using a small number of connection wires. A switch of the switch group 601 which is actuated by an operator of the system is distinguished by the switch key scanning and displayed on the display device 602, and in turn written in the RAM 605.

In the main unit 4 of the system, there are provided a control part having a CPU 401, RAM 402, and a ROM 403 like a control unit 6, an input interface 404, an output interface 405, a drive circuit 406, a driven part 407, and a source of input signals 408.

The driven part 407 includes a carrier drive motor 44 for moving the carrier to a position of a designated disc, a slider drive motor 80 for moving a disc from the storing position and loading the same in the playing position, a disc drive motor for rotating the disc, a pickup drive motor 56 for moving the pickup in a radial direction of the disc, and various displaying devices.

The source of input signals 408 includes the carrier position sensor 50 which, for example, consists of an optical means for detecting the carrier position, the carrier limit switches 49a and 49b provided so as to prevent the dislocation of the carrier, the slider limit switches for respectively detecting that the disc is in the storing position and in the playing position, the disc presence and disc side sensor 61 for detecting the presence or absence of the disc and determining the side of the disc, the disc detection position switch 89c for detecting the position of the operation of the disc presence and disc side sensor 61, pickup limit switches 69a, 69b for respectively detecting that the pickup is in the innermost position or in the outermost position, a disc drive motor speed sensor 1 for detecting that the speed of the disc drive motor is above a predetermined speed, and an information detection part which detects signals indicative of the inner most part of the recording tracks and the outermost part of the recording tracks, and an information of the number of recorded music piece, from a control signal detected from the disc via a predetermined demodulation circuit.

Two bit signals are used and applied to the drive circuit 406 for the control of the forward roatation, the backward rotation, and the stoppage of each motors. As an example, combinations (00), (01), and (10) may be used respectively as the representation of the stoppage, the forward rotation, and the backward roatation. In addition, for the purpose of speed control, one bit indicative of a high speed and a low speed of rotation can be added to the above combination. In that case, combinations (000), (001), (010), (101), and (110) may respectively represent the stoppage, the forward rotation at the low speed, the backward rotation at the low speed, the forward rotation at the high speed, and the backward rotation of the high speed. Further, it is possible to use a multi bit digital signal and a speed control means having a D/A (digital to analog) converter acceptable the multi bit digital signal.

The main unit 4 and the control unit 6 are connected by means of a bi-directional data transmission system 460 and the CPUs 401 and 603 perform the handshaking signal transmission of a predetermined coded parallel data and the timing signal of data transmission via a peripheral interface adapters (PIA) 409 and 608.

After throw-in of the power current, the main unit 4 drives the various parts of the mechanism at initial states to cause, for example, the stoppage of the disc drive motor 54, the releasing of the slider, the positioning of the carrier at the home position. After completion of the initial setting the main unit 4 requires the transmission of the disc number to the control unit via the bi-directional data transmission system 460. In response to the actuation of the START key 10 (shown in FIG. 2A) after the programming of the playing order, the control unit 6 transmits the data as to the number of the disc to be played first to the main unit 4 via the bi-directional transmission system 460. Then the main unit drives the carrier 40 so that the position of the carrier corresponds to the desigated disc number. The control of the stop position of the carrier 40 is performed, for example, by the comparision between a count signal of the output signal of the position sensor 50 disposed on the carrier 40 with a predetermined reference count number which is corresponding to a storing position of the designated disc. During this operation, the main unit 4 transmits to the control unit 6 data for displaying ACCESS via the bi-directional data transmission system 460 so that the main unit 4 and the control unit 6 display the sign indicative of the ACCESS operation in process.

When the carrier 40 arrives at the designated position and stops at the position, then the slider motor 58 starts to rotate and in turn the selected disc is loaded to the playing position. In this state, when the detection position switch 89c disposed in the middle postion of the disc loading mechanism is actuated, the output signal of the disc presence/disc side sensor 61 is entered and the loading of the disc is continued only when the proper side of the disc is detected. Conversely, if no disc has been set or the reverse side of the disc is detected, then the loading mechanism starts the revese operation to stop the loading. At the same time, a sign of error is displayed in the display device.

The disc loaded in the playing position is then clamped by the clamper 62, and the disc drive motor 54 starts to rotate. When the speed of the drive motor 54 has reached a predetermined level, the main unit requires the transmission of the data as to the number of the designated music piece to the control unit 6. After the transmission of the designated music number, the number is compared with the numbers of music pieces in the disc, and the pickup 55 is rapidly moved at a head portion of the selected music piece. If the designated music number is greater than the number of music pieces contained in the disc, the pickup limit switch 69b on the outermost side is actuated, thus it is determined that the designated music piece can not be found. In this condition, the pickup 55 is stopped and then moved at a high speed to the innermost position. Also in this condition, the display of the error will be effected.

When the pickup is moved to the position of the designated music piece, playing of the music is then started. At the same time, the display of the playing is effected in the display part. When the playing of the designated music piece is completed (when the number $n+1$ of a music piece greater than the number of the designated music piece by one is detected), the display of the playing is stopped and the main unit requires the number of music piece to be played next. Thus, the system starts the playing of the next one of the music pieces. If the disc to be played next is not the same as the disc being played presently, then the carrier is moved to the position of the new disc in a manner as previously explained, and the disc is loaded in the same manner as the described. If the disc to be played next is the same as the disc being played, then the main unit requires the transmission of the number of program (music), and the playing is started after the transmission of the number of program.

Referring to the block diagram of FIG. 11, the circuit arrangement of the control unit of the door 5 will be explained. As shown, the door switch 1 disposed in the front face of the main unit 4 produces a pulse signal through a differentiating circuit which comprises resistors $R_{111}$, $R_{112}$, and capacitors $C_{111}$, $C_{112}$. This pulse signal is applied to an AND gate 110 together with an output signal of the carrier limit switch 49a for detecting that the carrier 40 is in the home position. An output signal of the AND gate 110 is then applied to a T flip flop 111 as a clock signal. Output signal at two output terminals Q, $\overline{Q}$ of the T flip flop 11 are respectively applied to an AND gate 113 together with an output signal of the door open limit switch 31a and to an AND gate 114 together with an output signal of the door close limit switch 31b. Output signals of the AND gate 113 and the AND gate 114 are applied to the door drive motor 26 through the drive circuit 112 as a signal indicative of the forward rotation and a signal indicative of the backward rotation. A power reset signal is applied to a reset terminal of the T flip flop 111.

With the thus constructed control part, the reset signal is produced at the time of throw-in of the power current irrespective of the operation of the door open/close limit switches 31a, 31b, or the position of the carrier, and the T flip flop 111 is set such that the Q=L, $\overline{Q}$=H. Therefore, the door motor drive motor 26 is rotated reversely or in the backward direction to close the door, until the L level signal is produced by the close limit switch 31b. The output signal of the door switch 1 which is produced when operated, is effective only when the switch 49a produces the L level signal (indicating that the carrier 40 is in the home position), and the output signal state of the T flip flop 111 is inverted in that state, to drive the door drive motor 26 in the forward direction until the L level signal is produced by the door open limit switch 31a (indicating that the door is closed) or to drive the door drive motor 26 in the backward direction until the L level signal is produced by the door close limit switch 31b (indicating that the door is fully open). As will be appreciated from the foregoing, the door control unit is constructed to allow the opening of the door only when the carrier which carries the playing system is in the home position. Therefore, it is quite advantageous for preventing such an inconvenience that a new disc is inserted in the storing position of the disc being loaded in the playing position.

Figure 6B:
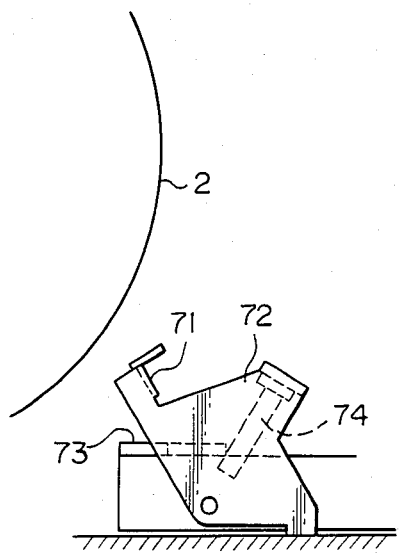
FIGS. 6B and 7B are side views of the disc stopper respectively corresponding to FIGS. 6A and 7A.

The operation of the disc player system having the above explained construction will be further explained. As for the setting or the storing of discs, the operation is simplified because the door 5 is opened automatically when the door switch 1 is operated, and the disc storing part 32 located behind the door 5 becomes readily accessible. To set a disc, the system simply requires to place the disc in any of the spaces formed between each adjacent partition plates 35. In this state, since the disc stopper 71 is positioned in the stop position by the engagement with the cam plate 73 of the carrier 40 (as shown in FIG. 6B), the inserted disc is prevented from being droping off backward and surely set in the disc storing position. In addition, the searching of the desirable disc or program will be facilitated by entering the title of the disc in the corresponding index plate provided in the control unit 6 and the program names in the MEMO part 13b thereof. All of the stored discs 2 are respectively assigned with a particular number and also all of the slot (disc storing position) of the disc storing part 32 are respectively assigned with a particular number. By using these numbers of the discs and the disc storing slots, the correspondene between each disc and each disc storing slot is memorized in the memory of the RAM 605 (see FIG. 10) through the number keys 7 of the control unit 6 at the time of storing the discs. In this memory of RAM 605, the data of the number of playing times of each disc during a predetermined period is also memorized. After the completion of the storing of the discs, the door 5 is automatically closed by pressing the door switch 1, then the selection of the disc becomes possible.

The way of the selection of the music piece is firstly, to use the number keys 7 of the control unit 6 to set the disc number and the music number in order. The other way of the selection of the music piece is to use the index plates 13 and the index keys 15 to select the desired disc by turning over the index plates 13, and to use the number keys 7 to set the music number.

As an example, it is assumed that the fifth music program of the third disc and the tenth music program of the twenty third disc of the stored discs are to be set by the first way of selection. In that case, the manner of the setting operation is as illustrated in FIG. 12A, in which the corresponding ones of the number keys 7 and the ENT key are pressed in order before pressing the START key. On the other hand, if the third music program of the eighth disc and the fifth music program of the thirty third disc are to be set by the second way of selection, the index plates 13 are in turn turned over until an index plate 13 on which the desired disc number is entered is opened as illustrated in FIG. 12b. It is to be noted that the index switches 14 are interlocked with the index plates and actuated when the index plates 13 are turned over. Thus, the connection of the index keys 15 are automatically altered as the turning of the index plates 13. Then the index key 15 corresponding to the number of disc to be selected (shown by hatching) is pressed and the music program number is set by using the number keys 7. As the previous way, the ENT key is pressed at the end of setting of the first music program, and the second music program is set in the same manner as above, and in which the index plate 13 is opened as shown in FIG. 12c. The whole operation of this setting process is illustrated in FIG. 12D.

When the entering of the disc number and the music program number of one of the above mentioned method is completed and the START key 10 is pressed, then the ACCESS indicator 20 lights up and each part of the system starts to operate.

Figure 13B:
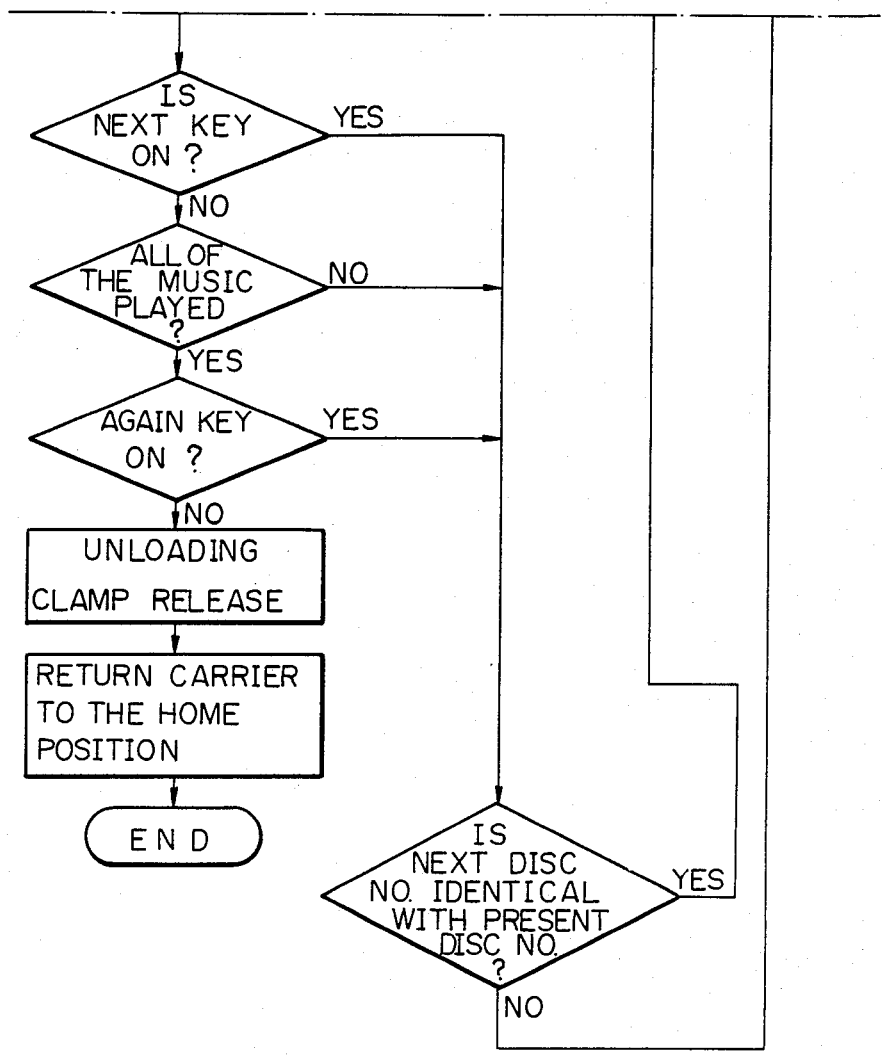
FIG. 13 is a flowchart showing the operation of the disc playing system.

The operation will be explained with reference to the flow chart of FIG. 13 hereafter.

Figure 7B:
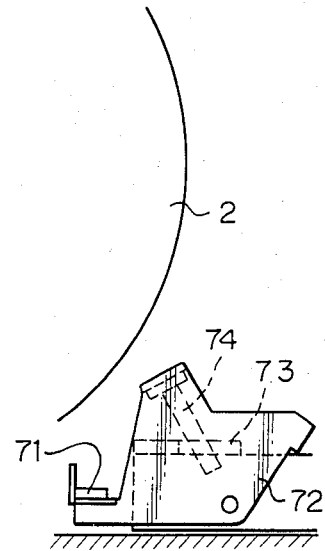

In response to a start command entered by the START key 10, the carrier assembly 64 is moved to the position of the selected disc. In this state, the cam pin 74 securely fixed on the stopper arm 72 of the disc stopper 71 is graduarry disengaged from the cam plate 73 of the carrier 40 as the carrier assembly 64 moves. As the result, disc stopper 71 for preventing the backward movement of the stored discs is rotated in the counter clockwise direction from the position illustrated in FIG. 6B to the siding position in which the disc can be drawn to the playing position without contacting with the disc stopper 71 as illustrated in FIG. 7B. As the carrier assembly 40 moves, the number displayed on the DISC indicator 16 increases by one and stops a the number corresponding to the selected disc, and the ACCESS indicator 20 is turned off during this period.

When the carrier assembly is stopped at the predetermined position, the slider 58 for the loading of the disc to the playing position starts to move. As the slider 58 moves, the STAND BY indicator 19 lights up. The STAND BY indicator 19 is turned on until the disc is loaded on the turn table 100, the disc drive motor 54 starts to rotate, and the playing of the music is started.

Figure 14A:
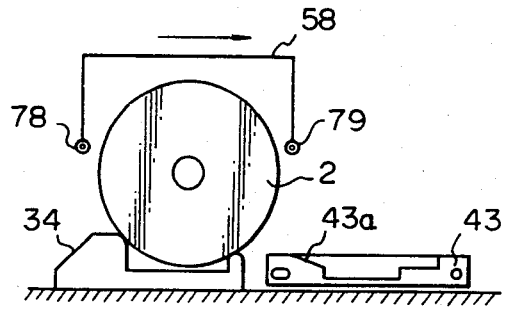
FIGS. 14A through 14C are diagrams showing the operation of the slider.
Figure 14B:
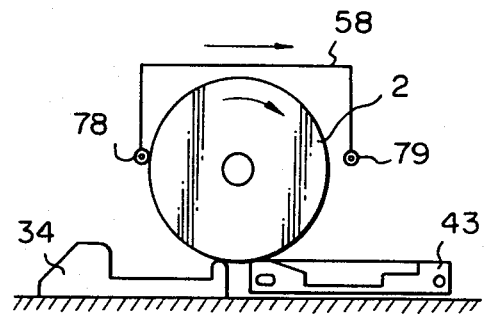
Figure 14C:
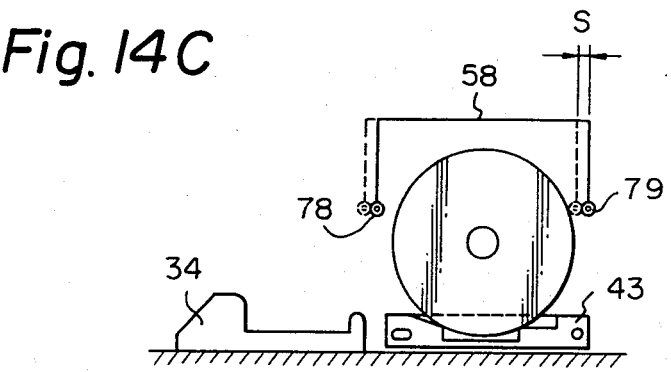

The operation of the slider part will now be explained with reference to FIG. 14. When the carrier 40 is stopped at the position of the selected disc, a drawer roller 78 and a reset roller 79 disposed on the slider 58 are in the position as illustrated in FIG. 14A. In this state, the slider motor 80 starts to rotate to move the slider backwards (in the direction shown by the arrow in the figure). By this movement, the drawer roller 78 comes to contact with the peripheral edge of the disc and moves the disc as the movement of the slider 58 to the playing position in which the disc is supported on the guide support 43 provided to the carrier 40 and having a slope 43a, and then catched by the clamper 62. Thus, the disc carried by the slider 58 is set on the guide support 43. Afterwards, the slider 58 is further moved beyond the disc set position, so as to provide a play S between the roller 78 or 79 and the periphery of the disc. Within this play S, the disc clamping operation to be explained later is performed.

Figure 15A:
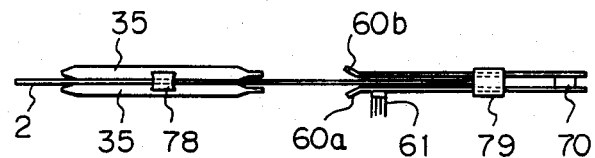
FIGS. 15A and 15B are respectively a plan view and a front view showing the relative position of each part during a period for the detection of the presence or absence of the disc and the detection of the disc side.
Figure 15B:
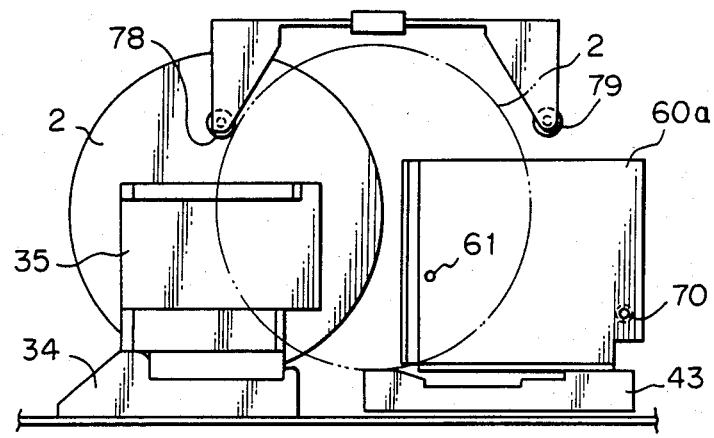

During the loading of the disc, the slider 58 turns on the detection position switch 89c by means of the cam portion 58a thereof. In response to this turrning-on of the detection position switch 89c, the disc presence/disc side sensor 61 disposed on the guide plate 60s is operated as illustrated in FIGS. 15A and 15B. If the disc is not present or the disc is placed reversely, then the direction of the movement of the slider 58 is turned over to return the disc in the disc storing part 32. At the same time, the ERROR indicator 21 lights up. If the disc has been set properly, the disc loading operation is continued and the disc is set in the playing position.

Figure 16:
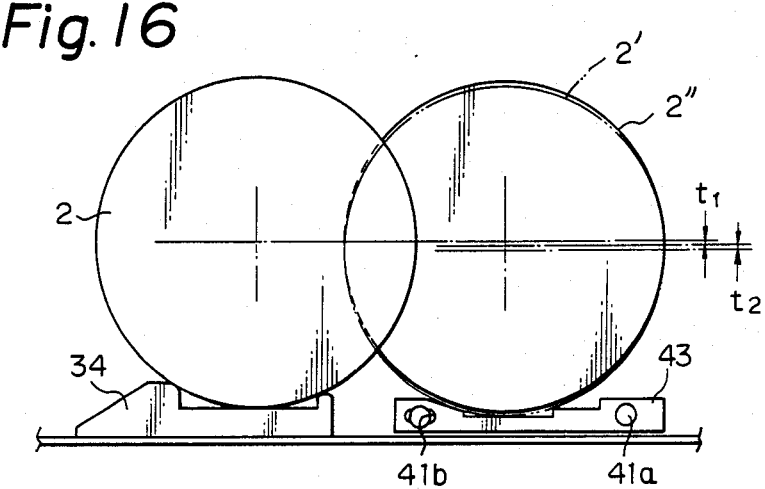
FIG. 16 is a diagram showing the relation between the positions of the disc in the disc storing part and in the playing position.

When placed in the playing position, the disc 2' is held on the guide support 43 at a level in which the center of the disc is higher than that of the discs 2 stored in the disc storing part 32 by an amount $t_1$. After the disc is set in the playing position, during the movement of the slider 58 providing said play S, the guide pin 96 fixed on the clamp arm 63 is catched in the guide slot 97a of the engaging member 97 fixed on the slider 58. As the result, the clamp arm 63 is rotated in the closing direction (counter clockwise direction). As the rotation of the clamp arm 63, the head portion of the clamper 62 passes through the center hole of the disc and is then inserted in the turntable 100. At the time of insertion, the magnetic element 99 on the head portion of the clamper 62 is attracted by the yoke 102 in the turntable 100, and the tapering portion 62a of the clamper 62 raises the disc 2' on the guide support 43 and the disc 2' is pressed to the face 100a of the turn table 100. In this state, the center of the disc 2" loaded on the turn table 100 is slightly higher than the position of the center of the disc 2' placed on the guide support 43 by an amount of $t_2$ ($t_2 < t_1$, see FIG. 16).

When the loading of the disc on the turntable is completed, the slider limit switch 89b is turned on to detect the completion of the clamping (the slider limit switch 89a detects that the slider 58 is in the home position). In response to the turning on of the slider limit switch 89b, the disc drive motor 54 starts to rotate. When the speed of the disc drive motor 54 has reached a predetermined level, the pickup 55 is moved at a high speed to the postion of the beginning of the designated music program. During this time, the ACCESS indicator 20 lights up and the PROGRAM indicator 17 indicates increasing numbers and finally indicates the number of designated music program at the same time as the pickup 55 is stopped at the position. From this position, the pickup 55 is moved at a predetermined constant speed to start the playing of the music. During playing, the STAND BY indicator 19 and ACCESS indicator are turned off, and in turn the PLAY indicator 18 lights up.

When all of the programmed music pieces have been played, the PLAY indicator 18 is turned off and the pickup 55 is returned to the home position. After that, the disc 2 is released from the clamper 62 and the turntable 100 and returned to the disc storing part 32. At the same time, the content of the memory of the RAM 65 which memorizes the number of the playing times within a predetermined period per disc is increased by one (+1). Then the carrier assembly 64 is moved back to the home position.

If a command for altering the order of the arrangement of discs which, for example, can be enterred by means of a switch provided in the control unit 6, is applied to the CPU 603, then the CPU 603 reads from a memory area of RAM 605 the number of times of playing during a period from a certain time in the past to the present time per disc. Then the CPU determines a new order of arrangement of discs in such a manner that the most frequently played disc is placed in a store position closest to the home position of the carrier assembly 64 and the least frequently played disc is placed in a store position farthest from the home position. Further, the CPU 603 temporarily stores the data of the correspondence between the disc number (numbers assinged to each disc) and the number of storing position (numbers assinged to each store position) into the other memory area of the RAM 605.

Then the CPU 603 compares the new correspondence with an old correspondence between the disc number and the number of the store position, and performs the rearrangement of the discs by moving the carrier assembly and utilizing the vacant slots 200 provided in the disc storing part 32 (shown in FIG. 3). When all of the discs are rearranged and the actual order of arrangement of the discs becomes identical with the order of the arrangement of the discs memorized in the memory part, the temporarily stored correspondence between the disc number and the number of the storing position is memorized in place of the old correspondence. At the same time, data of the number of playing times for each disc is cleared.

Althought the vacant slots to be used only during the rearrangement of the discs are provided in the above example, the same operation can be enabled with the normal arrangement of the disc storing part of the number m of the discs is smaller than the number n of the disc storing slots or positions ($n \geq m+1$). Further, the vacant slots 200 becomes unnecessary if the carrier 40 is designed to carry a plurality of discs at the same time.

In addition, instead of the number of times of playing, the number of times of selecting a disc can be used as the standard for the rearrangement. Further, by memorizing the playing (or selecting) date together with the above data, the standard of rearrangement will be a "weighted number of playing (selecting) times". With this method, it becomes possible to give a priority of determination of the position, to discs played or selected more recently, to realize more effective rearrangement in the practical use of the system. Further, the time of rearrangment is not limited to the avove example, and the rearrangement can be performed when the playing of the disc is taking place. Further, it is possible to design the system that that the rearrangement automatically performed when a predetermined time period has elapsed.

It is to be noted that the disc playing system of the present invention having the above explained consturction can be used for playing discs of various sizes. When the invention is applied for the playing system of the so called "compact disc" i.e. a digital audio disc, there will be a great advantage that the size of the playing system is by far reduced as compared with conventional "jukebox". Moreover, though the invention has been described by taking example of the system in which the disc playing means including the pickup 55 is incorporated in the carrier 40, the invention can be applied to a system in which the disc playing means is prepared separately from the carrier as a stationary unit. In that case, a carrier corresponding to the carrier 40 of the above example may be used only for the transmission of the disc, and a slider corresponding to the slider 58 may be used for transmitting the disc both between the disc storing part and the carrier, and between the carrier 40 and the disc playing means. Further, the invention can be applied to such systems in which the disc playing means is carried by the slider to the disc storing part, and the disc is brought over to a state for playing.

As described in detail hereinabove, the disc playing system of the present invention features that the correspondance between the disc number assigned to each disc and the number assigned to each storing position is memorized in the memory means and the frequency of playing of each disc is detected by a detection means. According to this data, administration or control of the playing frequency is performed. In other words, the order of the arragement of discs is changed and the content of the memory means is altered for the control of discs in the order of frequency of playing. Thus, the time period required for chaning the disc is shortened and a plurality of discs are played in succession with smoothness. Moreover, there is an advantage that the memorized data of the frequency of playing of each disc can be utilized for the determination of the time of a replacement of a disc and for other purposes of the maintenance of the discs and the playing system.

What is claimed is:

1. A disc playing system for playing selected ones of a plurality of stored discs in succession, comprising:
a disc storing part in which the plurality of discs are juxtaposed in a predetermined direction;
a disc carrying means slidable along said direction of arrangement of discs for carrying the disc to a playing position;
a transportation means for transporting a disc between said disc carrying means and said disc storing part;
a memory means for memorizing a correspondence between numbers assigned to each disc and numbers assigned to each storing position of said disc storing part;
a detection means for detecting a playing frequency of each disc; and
a control means for operating said disc carrying means and said transportation means for altering an order of arrangement of the discs in the disc storing part and altering said memorized correspondence in accordance with a detected result from of said detection means.

* * * * *